INVENTORS
Patrick L. Powell
Peter Wargo.

By William J. Newman

Attorney

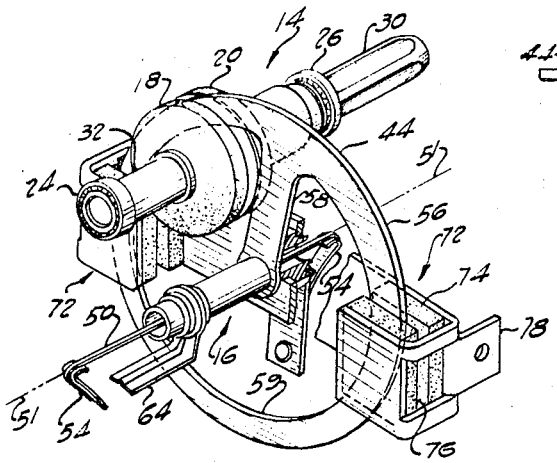

INVENTORS
Patrick L. Powell.
Peter Wargo

By William J. Newman
Attorney

United States Patent Office 3,452,606
Patented July 1, 1969

3,452,606
SPEEDOMETER
Patrick L. Powell, Franklin Park, and Peter Wargo, Maywood, Ill., assignors to Stewart-Warner Corporation, Chicago, Ill., a corporation of Virginia
Filed Oct. 22, 1965, Ser. No. 500,727
Int. Cl. G01p *15/00*
U.S. Cl. 73—496          7 Claims

ABSTRACT OF THE DISCLOSURE

A taut band movement speedometer including a speed ring driven by a pair of rotatable magnet assemblies positioned on either side of the ring, the axis of rotation of the magnet assemblies being transversely removed from the axis of rotation of the speed ring but within the aperture formed by the speed ring. There are included calibration means by which the magnetic flux paths of the magnetic assemblies are varied by means of a magnetic member adjacent to the magnetic assemblies. Damping assemblies are provided to limit not only the rotational movement of the speed ring, but also any transverse movement thereof with respect to its axis of rotation caused by shock and/or vibration.

---

Figure 1:
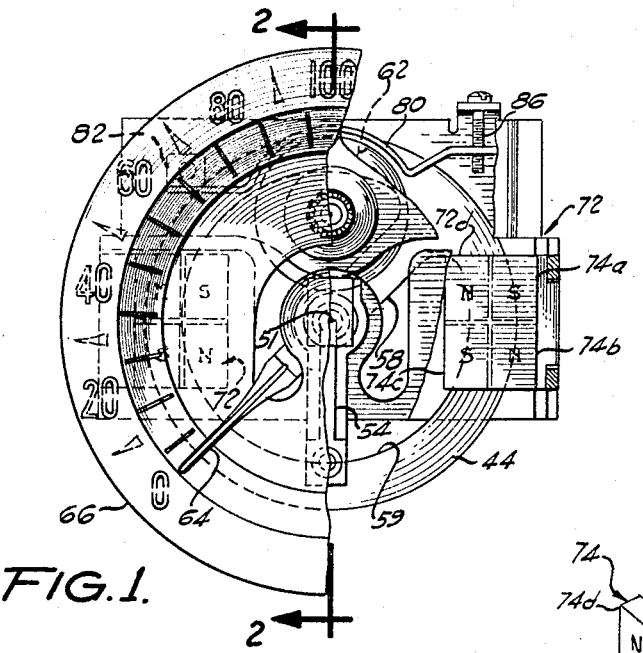

This invention relates to measuring and indicating devices. More particularly, it relates to measuring and indicating devices which are operable by mechanical drives such as magnetic type of speedometers. While the invention herein is not restricted to speed measuring devices, it will be discussed herein as it relates to the speedometer field.

The ordinary magnetic type speedometer in extensive use today comprises a rotatably mounted magnet which is adapted to be driven by a flexible cable drive or the like. An eddy current cup surrounds the magnet and is axially aligned therewith so that a torque is established in the cup to cause it to rotate against a spring biasing force. A pointer mounted for rotation with the eddy current cup registers an angular indication responsive to the speed of rotation of the magnet.

This type of construction has inherent defects which cause such meters to have relatively short life spans. They are thus not completely suitable for use with long lasting and hard driven equipment such as trucks, buses and the like. Because of the construction whereby the magnet and the eddy current cup rotate about coextensive axes, the magnet necessarily has a cantilever type bearing support on one side and provides a rotating bearing on its other side for journalling the eddy current cup. The rotating magnet, having a substantial mass, causes a relatively early failure of the cantilever bearing, especially if it is not perfectly balanced.

The coextensive axes construction of prior art speedometers also requires that one end of the shaft carrying the eddy current cup be journalled in a bearing carried by the rotating magnet member. Since the magnet is driven by the flexible shaft this bearing is subjected to a substantial amount of wear which would not be necessary if the bearing could be located elsewhere than in the rotating magnet member.

It is, therefore, a primary object of this invention to provide meter mechanisms operable by flexible shaft drives, or the like, which have relatively long life in comparison with present day meters.

It is also an object of this invention to provide a speedometer in which the rotating drive member is supported between at least two bearings.

Another object of this invention is to provide a speedometer in which the support means for the eddy current driven member is separate from the rotating magnet assembly.

It is another object of this invention to provide a unique speedometer utilizing a taut band suspension system.

It is also an object of this invention to provide unique damping means for taut band suspension movements which retards rotational movement and any transverse movement which might be caused by vibration or shock.

It is an additional object of this invention to provide unique calibrating means for a magnetic type speedometer.

Figure 8:
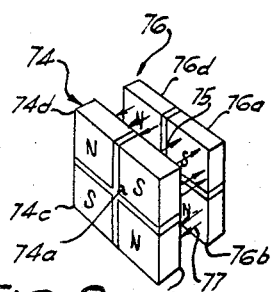
Figure 2:
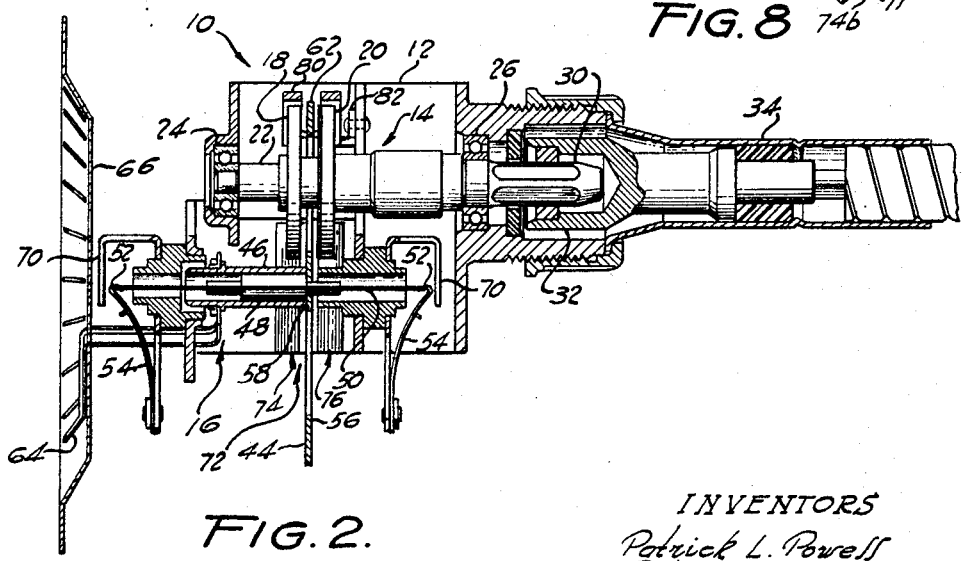
Figure 9:
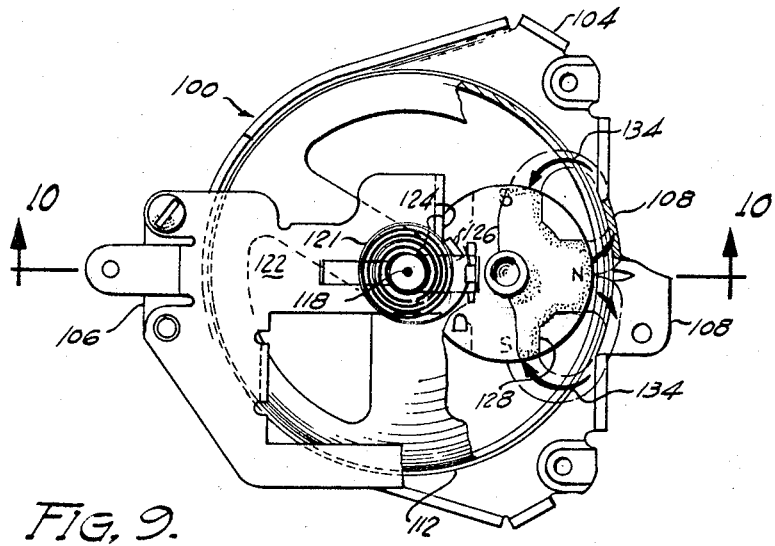
Figure 10:
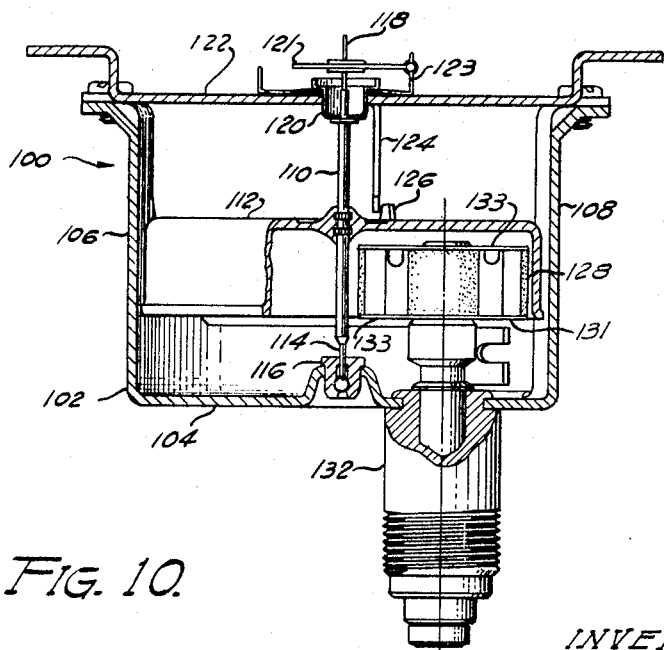

Other objects and advantages of this invention will become apparent upon a further study of this specification, especially when taken in view of the accompanying drawings, in which:

FIG. 1 is a front view, partially cut away, of a speedometer embodying the teachings of this invention;
FIG. 2 is a section view of the speedometer taken along the lines 2—2 of FIG. 1;
FIG. 3 is an isometric view or the operating mechanism of the speedometer;
FIG. 4 is an isometric detailed view of one type of calibration means for use with the speedometer shown in FIGS. 1, 2 and 3;
FIG. 5 is a diagrammatic representation of the manner in which the magnetic flux field is affected by the calibration mechanism shown in FIG. 4;
FIG. 6 is a detail isometric of another type of calibration means usable with this speedometer;
FIG. 7 is a diagrammatic representation of the manner in which the magnetic flux field is affected by the calibration means shown in FIG. 6;
FIG. 8 is a detail isometric of the sets of magnets forming one of the damping assemblies;
FIG. 9 is a front view of the operating portion of a speedometer mechanism incorporating some of the teachings of this invention; and
FIG. 10 is a section view of the mechanism of FIG. 9 taken along the line 10—10.

Referring first to FIGS. 1, 2 and 3, the speedometer 10 comprises a frame 12 upon which are mounted a driver assembly 14 and a driven assembly 16. The driver assembly 14 includes a pair of equidiameter discs 18, 20 mounted on a shaft 22 between frictionless bearings 24, 26 supported in the frame 12. The end 30 of shaft 22 is adapted to receive a female coupler 32 of a common type of flexible shaft cable 34.

Each of the discs 18, 20 comprises eight discreet, permanent-magnet segments 36, 38, respectively (FIG. 4). The magnets in each disc are arranged so that their polar axes are substantially oppositely disposed with respect to one another. The discs 18, 20 are arranged with respect to one another, so that each magnet segment 36, 38 confronts a respective magnet segment of the other disc and opposite poles of the respective magnet segments confront each other across the space 40 between the two discs. Thus alternately directed magnetic flux fields are established between the two discs as represented by arrows 42, 42a in FIGS. 5 and 7. The plate 21 at the side of magnet disc 20 has a temperature coefficient of reluctance opposite to that of the magnet 18 and 20 thus providing temperature compensation.

The driven assembly 16 comprises a nonmagnetic, electrically conductible eddy current member 44 (FIGS. 1, 2 and 3) which is fixed by means of a tubular support 46 and insert plug 48 to the center portion of a flat resilient band 50. The band 50 is tautly held at its ends 52 by the spring supports 54 attached to the frame 12. The taut band 50 thus supports the member 44 for rotation about the axis 51 defined by the band 50, and it also serves to define a stop position for the member 44 as well as provide the bias force tending to restore the member 44 to its stop position.

The eddy current member 44 comprises a ring 56 with a single spoke 58 which is fastened to the taut band 50 as hereinbefore described. As may best be seen in FIG. 3, the driver assembly 14 is positioned so that the magnet-driven shaft 22 passes through the opening 59 defined by the ring 56 and spoke 58 with the discs 18 and 20 disposed on either side of the ring 56. Thus, the magnets 36, 38 in the respective discs 18, 20 define magnetic flux paths through the segment 62 of the ring 56 between confronting portions of the disc. These magnetic fields moving through the segments 62 of the ring 56, as the discs rotate, generate eddy currents in the ring and produce a torque for rotating the eddy current member 44 about the axis defined by the taut band 50.

A pointer 64 is also carried by the tubular support 46 fixed to the taut band 50 and rotates with the eddy current member 44 to register the speed in cooperation with the dial 66 supported by the frame 12. As shown in FIG. 1, the device is arranged for clockwise movement of the member 44 and pointer 64 with increasing speeds. The spoke 58 of the eddy current member 44 is preferably located immediately adjacent the drive shaft 22 at its stop position thereof so that maximum rotation of the eddy current member 44 may occur before the spoke 58 encounters the shaft 22.

It is to be understood that the driver assembly 14 may be positioned outside of the member 44 is desired, and that the member 44 may then be a plain flat disc. The arrangement as shown and herein before described is preferred, however, because of two distinct advantages. First, the described arrangement obviously provides a more compact device which may be important in some installations. The second advantage is brought about by conventions in the automotive industry which require that the direction of rotation of the core of the flexible cable, and hence the discs 18, 20 be in clockwise direction as viewed from the position of FIG. 1. Therefore if the drive assembly 14 is placed outside the member 44, the torque produced therein will be in the direction to cause it and the pointer to move in a counterclockwise direction with increasing speeds. This is undesirable because vehicle operators have become used to the clockwise indicator movement. The location of the drive assembly within the opening 59 of the eddy current member 44 results in the desired clockwise rotation of the indicator 64.

The taut band type suspension provides a relatively inexpensive, sensitive and linear movement. However, problems may arise if the device is used in an environment subject to vibrations or shock which must be provided for. Movement of the driven assembly must be restricted not only along the direction of the taut band 50, but also in all directions transverse thereto.

Axial translation of the taut band suspended driven system 16 is mechanically limited by stops 70 adjacent the ends of resilient arms 54. The stops 70 are integral parts of the frame 12 and bent into place after the driven assembly 16 has been assembled to the frame 12.

The transverse movements of the taut band suspension are limited by magnetic damping assemblies 72 located at diametrically opposed positions adjacent the periphery of the ring 44. Each of the assemblies 72 comprises two sets 74, 76 of four magnets mounted on either side of the ring 56 by a ferromagnetic bracket 78. The four magnets in each set are in alternating quadrature arrangement and aligned with the respective magnets of the other set to have opposite poles in confronting arrangement, as shown in FIGURE 8. Thus four, separate, alternating opposite magnetic fields are established through the ring in the gap between the sets. That is, the flux between magnets 74a, 76a and between magnets 74c and 76c is established in one direction, as shown by arrows 75, whereas the flux between magnets 74b, 76b and magnets 74d, 76d is established in the opposite direction, as shown by arrows 77. Opposite adjacent flux fieflds provide a very efficient means for damping movement of the eddy current ring 44 in a direction transverse to the interface between the opposing fields. Thus the combination of magnets 74a, 76a and magnets 74b, 76b cause damping in the vertical direction as received in FIG. 1. Likewise the combination magnets 74a, 76a and magnets 74d, 76d cause damping in the horizontal plane. Substantially all planar movement of the member 44 is thereby retarded by the damping action of the flux field established by the assemblies 72. Not only is movement transverse to the axis 51 retarded, but also rotational movement of the member 44. Thus, the assemblies 72 provide the necessary operational damping to prevent pointer oscillation as well as transverse damping to retard movement of the member 44 due to vibration or shock.

It has been found that a single assembly 72 will not properly accomplish these purposes because the flux fields provided by the assembly locks the segment of the ring 56 therebetween to provide a new center of rotation. Transverse vibrations in that case cause the member 44 to oscillate about some point in the ring segment within the assembly 72.

The device is calibrated by means of an arm 80 having one end 82 fastened to the frame 12 and the other end 84 adjustably movable by screw 86 mounted in the frame 12. The arm 80 is fabricated of a nonpermanent magnetic material and is shaped and positioned to have portions 88, 90 (FIG. 4) adjustably located adjacent the periphery of the discs 18, 20. The slot 92 between the portion 88 and 90 is merely to provide for the eddy current rotating member 44.

The configuration of the calibration means shown in FIG. 4 has the effect of decreasing the sensitivity of movement as the portions 88 and 90 are adjusted closer to the discs 18, 20. The diagrammatic representation in FIG. 5 indicates that this is so because the portions 88, 90 divert some of the magnetic flux from the space 40 between the magnet segments 36, 38 in which the ring 56 is disposed. As the distance A between the portions 88, 90 and the magnetic segments 36, 38 decreases more flux is diverted therethrough and less is available for creating eddy currents in the magnetic ring.

FIG. 6 shows another configuration for calibrating the device which has the opposite effect of that shown in FIG. 4. The arm 93 has the same mechanical motion as that described for arm 80 and it differs therefrom only in the fact that it has side flanges 94, 96 which are positionable adjacent the sides of the discs 18, 20. The diagrammatic representation of FIG. 7 shows that the flanges 94, 96 have the effect of increasing the flux across the gap 40 by providing short circuits for the flux as it passes between adjacent magnets in each disc. The total air gap in the magnetic circuit is thus lessened which increases the total flux through the gap 40. Thus, in this case, when the portions 94, 96 are in closest proximity to the discs 18, 20, the sensitivity of the meter is increased which is opposite to the effect for the configuration of FIG. 4.

The magnet segments in the discs 18, 20, as well as those in the damping assemblies 72, may be individual magnets if desired. Alternatively, they may be individually polarized segments in a single piece of magnetic material, such as Alnico 8.

Reference is now made to FIGS. 9 and 10 for a detailed description of another speedometer mechanism embodying some of the teachings of this invention. The speedometer mechanism 100 comprises a frame 102 consisting of a base portion 104 and two integral supporting arms 106, 108 projecting therefrom. A shaft 110 carrying an electric-current-conducting, non-magnetic cup member 112 has one end 114 journalled in a bearing 116 carried by the base portion 104 of the frame 102. The other end 118 of shaft 110 is journalled in a bearing 120 carried in a bracket 122 suspended across and attached to the supporting arms 106, 108 of the frame 102. A coil spring 121 attached at one end to the shaft 110 and at the other end to a spring regulating member 123 biases the shaft 110 and cup-shaped member 112 to a stop position. The stop position is defined by a projection 124 from the bracket 122 in cooperation with a projection 126 from the cup-shaped member 112.

A rotating magnet 128 is positioned within the cup-shaped member 112 and journalled by sleeve bearing 132 for rotation about an axis 130 parallel to, but displaced from, the shaft 110. The magnet 128 is cross-shaped and polarized to have sequentially, alternating poles around its periphery so that the magnetic lines of flux will extend between adjacent poles as indicated by the dotted lines 134 in FIG. 9. Discs 131, in adherence to either side of the magnet provide temperature compensation for the magnet in a well known manner.

To insure that the magnetic lines of flux between the poles of the rotating magnet 128 pass through the cup member 112, the supporting arm 108 is located adjacent the point of closest proximity between the magnet 128 and the cup 112, and is fabricated of a non-permanent ferromagnetic material. The rotating magnet will thus, alternately direct the magnetic flux through the cup and cause eddy currents to be generated therein which coact with the magnetic flux to provide the torque for rotating the cup.

The mechanism 100 of FIGS. 9 and 10, as well as the mechanisms of FIGS. 1 through 8, eliminate the bearing for the speed cup and pointer shaft required in the rotating members of the prior art devices. The rotating bearing is replaced by the stationary bearing 116 mounted in the frame base 104, and hence, may be much cheaper while having a longer lifetime.

It is recognized that many other alternatives, modifications and additions might be made to the preferred embodiments as shown herein. It is, therefore, intended to be bound only by the scope of the appended claims.

What is claimed is:

1. In a speedometer operable by a flexible cable drive, or the like, the combination comprising a frame; a round, electrically-conductive, nonmagnetic member; means including a taut resilient band for supporting said member in said frame for rotation about an axis, defining a stop position for said member and biasing said member towards the stop position; a shaft, a pair of bearings on said frame journalling said shaft for rotation by said flexible cable drive about an axis parallel to said first axis; and means carried by said shaft including at least one pair of magnets adjacent the path of travel of said member for generating eddy currents therein and driving said member away from said stop position a distance proportional to the speed of rotation of the drive means, means including magnets providing oppositely directed magnetic fields forming a plurality of field interfaces passing through said member, said magnets positioned with respect to said member to oppose planar motion of said member in any direction.

2. In a speedometer operable by a flexible cable drive, or the like, the combination comprising a frame; a round, flat, electrically-conductive, nonmagnetic member; means including a taut band for supporting said member in said frame for rotation about said taut band, defining a stop position for said member and biasing said member towards the stop position; a shaft; a pair of bearings on said frame journalling said shaft for rotation by said flexible cable drive about an axis parallel to said taut band; a pair of equidiameter discs fixed to said shaft between said bearings on opposite sides of the member and having confronting portions overlapping a segment of said member, each of said discs having an even plurality of permanent magnets equally spaced about its periphery, the polar axes of the magnets in each discs being parallel to said shaft and alternately arranged with one another, the magnets of each disc having opposite poles in confronting arrangement with respective magnets of the other disc to define magnetic flux paths through said member segment; a pair of damping assemblies positioned adjacent diametrically opposed segments of said member, each of said assemblies comprising a set of four magnets on each side of said member having their polar axes oppositely aligned parallel to said taut band in a quadrature arrangement, the magnets of each set having opposite poles in confronting arrangement with respective magnets of the other set to define separate magnetic flux paths through said member.

3. In a speedometer operable by a flexible cable drive, or the like, the combination comprising a frame; a round, flat, electrically-conductive, nonmagnetic ring having a spoke extending to the geometric center thereof; a flat, resilient, taut band having its ends fixed to said frame and its center fixed to said spoke at the geometric center of said ring; a shaft; a pair of bearings on said frame journalling said shaft for rotation by said flexible cable drive about a second axis parallel to said taut band and within the opening defined by said ring and spoke; a pair of equidiameter discs fixed to said shaft between said bearings on opposite sides of the ring and having confronting portions overlapping a segment of said ring, each of said discs having an even plurality of permanent magnets equispaced about its periphery, the polar axes of the magnets in each disc being parallel to said shaft and alternately arranged with one another, the magnets of each discs having opposite poles in confronting arrangement with respective magnets of the other disc to define magnetic flux paths therebetween through said ring segment; and a pair of damping assemblies positioned adjacent diametrically opposed segments of said ring, each of said assemblies comprising a set of four magnets on each side of said ring having their polar axes oppositely aligned parallel to said taut band in a quadrature arrangement, the magnets of each set having opposite poles in confronting arrangement with respective magnets of the other set to define separate magnetic flux paths through said ring.

4. In a speedometer operable by a flexible cable drive, or the like, the combination comprising a frame; a round, flat, electrically-conductive, nonmagnetic ring having a spoke extending to the geometric center thereof; a flat, resilient, taut band having its ends fixed to said frame and its center fixed to said spoke at the geometric center of said ring; a shaft; a pair of bearings on said frame journalling said shaft for rotation by said flexible cable drive about a second axis parallel to said taut band and within the opening defined by said ring and spoke; a pair of equidiameter discs fixed to said shaft between said bearings on opposite sides of the ring and having confronting portions overlapping a segment of said ring, each of said discs having an even plurality of permanent magnets equispaced about its periphery, the polar axes of the magnets in each disc being parallel to said shaft and alternately arranged with one another, the magnets of each discs having opposite poles in confronting arrangement with respective magnets of the other disc to define magnetic flux paths therebetween through said ring segment; a calibration assembly comprising an arm having one end fastened to said frame and two nonpermanent-magnetic portions each of which is adjacent the confronting portion of a respective disc, a screw in adjustable relationship between the other end of said arm and said frame for varying the position of said magnetic portions with respect to the periphery of said discs; and a pair of damping assemblies positioned adjacent diametrically opposed segments of said ring, each of said assemblies comprising a set of four magnets on each side of said ring having their polar axes oppositely aligned parallel to said taut band in a quadrature arrangement, the magnets of each set having opposite poles in confronting arrangement with respective magnets of the other set to define separate magnetic flux paths through said ring.

5. In combination with a meter having a pointer mounted on a suspension including a taut band, apparatus for damping motion of said pointer comprising an electrically-conductive, nonmagnetic substantially circular member supported by said taut band in a plane perpendicular to the axis of said taut band, a plurality of magnetic assemblies adjacent to and equispaced about the periphery of said member, each of said assemblies comprising means for establishing magnetic flux paths through said member adjacent its periphery to thereby dampen rotational motion about the axis of said taut band and transverse motion normal to the axis of said taut band.

6. In the combination of claim 5 wherein there are provided two magnetic assemblies diametrically opposed from one another with respect to the axis of said taut band.

7. In the combination of claim 5 wherein each of said magnetic assemblies comprises magnets providing oppositely directed magnetic fields forming at least one magnetic field interface.

References Cited

UNITED STATES PATENTS

| | | | |
|---|---|---|---|
| 1,367,690 | 2/1921 | Genn | 73—519 |
| 1,630,833 | 5/1927 | Cowdrey | 73—496 |
| 2,593,646 | 4/1952 | Andresen | 73—519 |
| 2,642,274 | 6/1953 | Andresen | 73—519 |
| 3,135,119 | 6/1964 | Hauptman | 73—519 |
| 3,196,692 | 7/1965 | Jensen | 73—519 |
| 3,277,370 | 10/1966 | Clark | 324—154 |
| 3,317,837 | 5/1967 | Takeda et al. | 324—154 |
| 3,325,734 | 6/1967 | Peltola | 324—154 |

FOREIGN PATENTS 137,181    2/1960    U.S.S.R.

JAMES J. GILL, *Primary Examiner.*

ROBERT S. SALZMAN, *Assistant Examiner.*

U.S. Cl. X.R.

73—430, 519